United States Patent [19]

Blakley

[11] Patent Number: 4,899,358
[45] Date of Patent: Feb. 6, 1990

[54] CALL ANNOUNCEMENT ARRANGEMENT

[75] Inventor: James R. Blakley, Chicago, Ill.

[73] Assignee: American Telephone and Telegraph Company AT&T Bell Laboratories, Murray Hill, N.J.

[21] Appl. No.: 230,224

[22] Filed: Aug. 8, 1988

[51] Int. Cl.$^4$ .................. H04M 1/57; H04M 3/50
[52] U.S. Cl. .................................. 379/67; 379/88; 379/142; 379/208; 379/215
[58] Field of Search ............... 379/142, 249, 214, 215, 379/88, 89, 67, 208

[56] References Cited

U.S. PATENT DOCUMENTS

| | | | |
|---|---|---|---|
| 4,054,756 | 10/1977 | Comella et al. | 379/89 |
| 4,551,581 | 11/1985 | Doughty | 379/94 |
| 4,672,660 | 6/1987 | Curtin | 379/88 |
| 4,720,848 | 1/1988 | Akiyama | 379/88 |
| 4,805,207 | 2/1989 | McNutt et al. | 379/89 |

FOREIGN PATENT DOCUMENTS

| | | | |
|---|---|---|---|
| 3421886 | 12/1985 | Fed. Rep. of Germany | 379/142 |
| 0013862 | 2/1981 | Japan | 379/142 |
| 0020367 | 2/1981 | Japan | 379/142 |
| 0164658 | 12/1981 | Japan | 379/142 |
| 0068961 | 4/1982 | Japan | 379/142 |
| 0041358 | 3/1985 | Japan | 379/142 |
| 0054559 | 3/1985 | Japan | 379/215 |
| 0059854 | 4/1985 | Japan | 379/142 |
| 0148949 | 7/1986 | Japan | 379/214 |
| 0261953 | 11/1986 | Japan | 379/214 |

OTHER PUBLICATIONS

"Text-to-Speech Synthesis for Pronouncing Names and Addresses in a Telecommunications Service: Designing the User Interface", C. J. Karhan, et al., Proceedings of AVOIS Systems Application Conference, 9/1986.

"Supplementary Voice", 5ESS ® Switch, ISDN Basic Rate Interface Specification, 5E4 Generic Program, AT&T 5D5-900-301 pp. V-94-V-105, Sep. 1985.

"Audio Identification of a Calling Subscriber's Number in a Telephone Switching System", Cozza and Weiss, IBM Technical Disclosure Bulletin, vol. 9, No. 3, Aug. 1966, pp. 262, 263.

Primary Examiner—Thomas W. Brown
Attorney, Agent, or Firm—Ross T. Watland

[57] ABSTRACT

A call announcement arrangement that obtains the calling party name from a database search and uses a text-to-speech unit to generate speech signals for transmission to the called communication station. The calling party name is spoken at the station instead of being displayed. For a conventional analog station, the name is spoken after the called party has answered in response to ringing at the station but before a connection is completed to the caller. The called party accepts the caller either by remaining off-hook or by transmitting a connection signal using, for example, flash or tone signaling. For other illustrative station equipment such as an ISDN speakerphone or a specially adapted analog speakerphone, the calling party name is spoken before the called party answers in place of or in addition to normal ringing. Caller-identifying speech signal are also transmitted to a station determined to be busy to announce the caller name for a call waiting call.

26 Claims, 10 Drawing Sheets

CALL ANNOUNCEMENT ARRANGEMENT

CROSS-REFERENCE TO RELATED APPLICATION

This application is related to the application of J. R. Blakley entitled "Telephone Station Set", Ser. No. 07/230,281, filed August 8, 1988 and assigned to the assignee of the present invention.

TECHNICAL FIELD

This invention relates to telecommunication call processing.

BACKGROUND AND PROBLEM

As stored program-controlled switching systems have evolved, a wide variety of useful features have been developed to extend the communication capabilities such systems provide. Incoming calling line identification, a feature that displays the caller's number for incoming calls to a called customer station, allows selective acceptance of certain calls based on the calling number while other calls are either not answered or are routed to a message center. The feature is implemented by transmitting the calling line identification to the called customer station in a data message—for example, to an analog station during a silent interval between ringing or to an integrated services digital network (ISDN) station in the out-of-band D-channel used for call control signaling. Since customers typically remember only a few, frequently called telephone numbers, a related feature that provides a display of the caller name is substantially more useful to customers in deciding whether to accept a call. With a known call waiting feature where a caller-identifying data message is transmitted out-of-band, as for an ISDN station, a customer already engaged in an ongoing telephone conversation is informed of the caller identity for a second call that is coming in. Although such features provide customers with much greater control over their telephone communications, conventional analog stations, which represent a large majority of the customer stations in use today, are not equipped to either process or display data messages. In addition, modification of the normal human response of answering a ringing telephone, such that a customer glances at a display to determine caller identity before answering, is difficult, particularly for customers that use the features only infrequently.

In view of the foregoing, recognized problems in the art include the substantial communication station cost and the difficult human factors associated with the implementation of caller-identification features using data messages and requiring an advanced station display.

SOLUTION

The foregoing problems are solved and a technical advance is achieved in accordance with the principles of the invention in an illustrative call announcement arrangement where, once the calling party name is obtained from a database search, a text-to-speech unit generates speech signals, rather than a data message, for transmission to the called communication station. The calling party name is spoken at the station instead of being displayed. For a conventional analog station, the name is spoken after the called party has answered in response to ringing at the station but before a connection is completed to the caller. The called party accepts the call either by remaining off-hook or by transmitting a connection signal using, for example, flash or tone signaling. For other illustrative station equipment such as an ISDN speakerphone or a specially adapted analog speakerphone, the calling party name is spoken before the called party answers in place of or in addition to normal ringing. Caller-identifying speech signals are also transmitted to a station determined to be busy to announce the caller name for a call waiting call.

A call from a calling communication station to a called communication station is processed in accordance with a method of the invention by first effecting a search for information associated with the calling station and thereafter transmitting speech signals, generated from information obtained during the search, to the called station.

Illustratively, the information obtained during the search could be text or recorded speech comprising, for example, a caller name and/or directory number, a privacy indicator, or a definition of the call as a toll call. The caller name may be selected from a personalized list of names, e.g., Mom, Grandpa Smith, etc., that the called customer has previously defined for use in announcing frequent callers. A communication path is completed between the calling and called stations only after the transmission of call announcement speech signals has been initiated. If the called station transmits disconnect signaling in response to the announcement, speech signals representing call information, including the information obtained during the search, are transmitted to a message center. The speech signals assure that an accurate recording of, for example, caller identification and time-of-call information, is made before a communication path is completed to the message center for a caller message.

An improved call waiting feature is performed for a call from a calling communication station to a called communication station in accordance with a method of the invention by first determining whether the called station is busy on a previous call. Speech signals are transmitted to the called station in response to a determination that the called station is busy.

Illustratively, for a conventional analog station, the communication path from the previous caller is disconnected before the call announcement speech signals are transmitted. A communication path is again completed between the previous caller and the called station after speech signal transmission. If flash signaling is thereafter received from the called station, the communication path from the previous caller is disconnected and a communication path is completed between the second caller and the called station. However, if a predefined time period expires without receiving flash signaling from the called station, speech signals representing call information are transmitted to a message center. A communication path is then completed from the second caller to the message center.

For an ISDN speakerphone station, when it is determined that the station is busy, the previous call need not be interrupted since the caller-identifying speech signals are transmitted on a communication path that is distinct from the path for the previous call.

DETAILED DESCRIPTION

Figure 1:
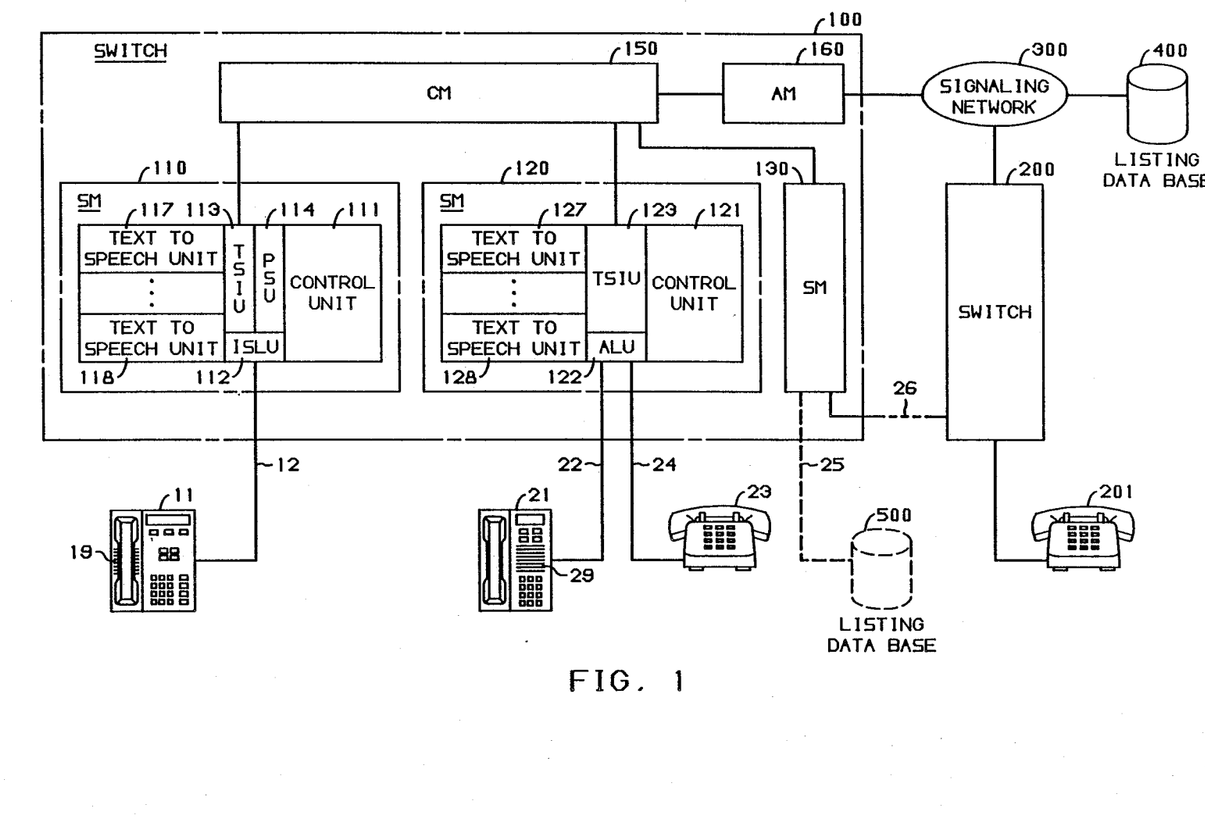
FIG. 1 is a block diagram of a switching network configuration including an exemplary call announcement arrangement and illustrative communication stations.
Figure 2:
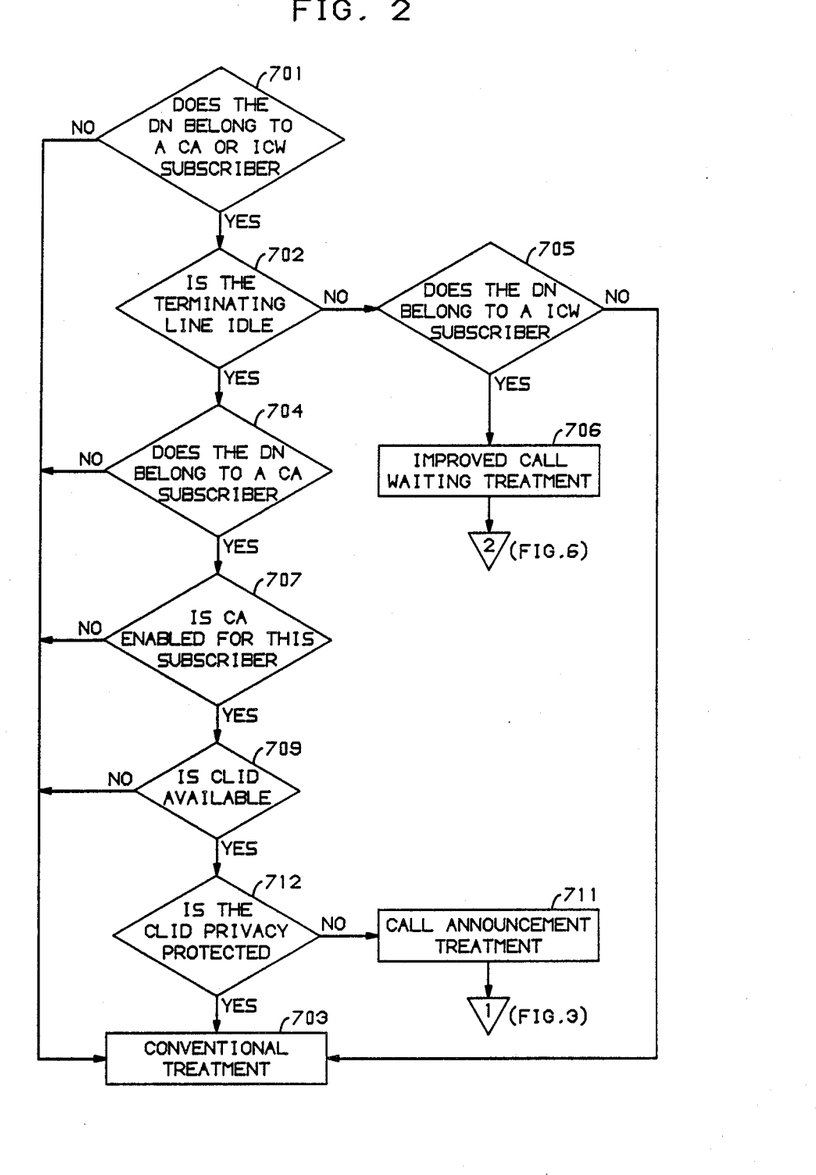
FIGS. 2-7 present a call processing flow chart illustrating implementations of call announcement and improved call waiting features for a switch included in the configuration of FIG. 1.

An exemplary call announcement arrangement is described herein in the context of the switching network configuration of FIG. 1, having two central office switches 100 and 200, an inter-switch signaling network 300, e.g., a CCS7 network, a listing database 400 accessed via signaling network 300, and illustrative communication stations including conventional analog stations 23 and 201, an integrated services digital network (ISDN) speakerphone station 11, and an analog speakerphone station 21 that is specially adapted for providing call announcements. Switches 100 and 200 are interconnected by a communication path 26 which may include intermediate switches.

Illustratively, switch 100 is a distributed control, ISDN switching system such as the system disclosed in U.S. Pat. No. 4,592,048 issued to M. W. Beckner et al., on May 27, 1986. An integrated services digital network (ISDN) is defined as a network evolved from the telephony integrated digital network that provides end-to-end digital connectivity to support a wide range of services, including voice and non-voice services, to which users have access by a limited set of standard multipurpose customer interfaces. Switch 100 is connectable to analog and digital stations and inter-switch trunks. Switch 100 includes a number of switching modules (SMs) each associated with a different subset of stations or trunks. Each switching module includes a control unit for controlling connections to and from its associated stations or trunks. Switching module 110, for example, includes control unit 111 for controlling connections to and from station 11. Similarly, switching module 120 includes control unit 121 for controlling connections to and from stations 21 and 23.

Each ISDN station communicates with switch 100 in two 64 kilobits per second channels referred to as B-channels and in one 16 kilobits per second channel referred to as a D-channel. Each of the B-channels is usable to convey digitized voice samples at the rate of 8000, eight-bit samples per second or data at a rate of 64 kilobits per second. The D-channel is used both to convey signaling packets to effect message signaling between ISDN stations and switching module control units, and to convey data packets between different ISDN stations.

In the present embodiment, information is conveyed between ISDN station 11 and switch 100 using a four-wire, digital subscriber line (DSL) 12 using one pair of wires for each direction of transmission. DSL 12 transmits a serial bit stream at the rate of 192 kilobits per second which comprises 144 kilobits per second for the above-mentioned two 64 kilobits per second B-channels and one 16-kilobits per second D-channel and which further comprises 48 kilobits per second used for a number of functions including framing, DC balancing, control and maintenance. DSL 12 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between ISDN stations and the switching module control units enclosed in level 2 (link-level) frames in accordance, for example, with the standard LAPD protocol. The exemplary signaling messages used for the control of circuit-switched voice calls are in accordance with CCITT recommendation Q.931.

The architecture of switch 100 has communications module (CM) as a hub, with the switching modules (SMs) 110, 120, and 130, and an administrative module (AM) 160 emanating therefrom. Switching module 110 includes an integrated services line unit (ISLU) 112 which terminates the digital subscriber lines, e.g., 12, and provides access to a time-slot interchange unit (TSIU) 113 and a packet switching unit (PSU) 114. TSIU 113 and PSU 114 respectively provide circuit-switched and packet-switched connections to and from the associated station 11 under the control of control unit 111. Switching module 110 further includes a number of text-to-speech units, e.g., 117, 118, for generating speech signals from text to provide call announcements in accordance with the invention and transmitting such speech signals via TSIU 113 and ISLU 112 to station 11. One illustrative text-to-speech unit is the DECTALK DCTO3 unit manufactured by Digital Equipment Corporation. Switching module 120 includes an analog line unit (ALU) 122 which terminates conventional analog lines, e.g., 22 and 24, and provides access to a TSIU 123. TSIU 123 provides circuit-switched connections to and from the associated stations 21 and 23 under the conrol of control unit 121. Switching module 120 also includes a number of text-to-speech units, e.g., 127, 128. (Although in the present example, switch 100 has text-to-speech units associated with both switching modules 110 and 120, units associated with a single switching module are usable by connection through communications module 150 for stations served by other switching modules.) Switching module 130 is similar to switching modules 110 and 120 but, rather than line units, includes the appropriate analog or digital trunk unit (not shown) for interfacing with the outgoing trunk included in communication path 26 to switch 200. In an alternative embodiment (shown by dashed lines in FIG. 1), switching module 130 accesses a listing database 500 via a digital X.25 trunk 25, rather than administrative module 160 accessing listing database 400 via signaling network 300.

Communications module 150 includes a time-shared, space-division switch or time-multiplexed switch, that provides 64 kilobits per second circuit-switched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 160 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

To complete the description of FIG. 1, switch 200 is shown connected to a conventional analog station 201 used, for purposes of illustration, as the originating station in the examples described herein. The architecture of switch 200 and the types of stations served by switch 200 are not important to the present invention and are not described further herein.

The technological advances made in the field of text-to-speech processing, particularly those related to the correct pronunciation of names, make two new features, referred to herein as call announcement (CA) and improved call waiting (ICW), particularly desirable to telephone customers served by switch 100.

When a call is directed to a CA subscriber and the name of the calling party is available, distinctive alerting is applied to the subscriber station. When the subscriber goes off-hook, rather than connecting the calling party to the subscriber, the name of the calling party is spoken using text-to-speech and the called party then has the option of connecting to the calling party (by transmitting dual tone multi-frequency (DTMF) or flash signaling or by remaining off-hook for more than a predefined time) or by hanging up without an indication being given to the calling party that the call was rejected.

The called subscriber can transmit DTMF or flash signaling during the announcement of the calling party name (CPN) and be immediately connected to the calling party. The calling party may deny forwarding of his/her name either with a one time service request or on a per call basis. The subscriber may activate or deactivate the service using feature codes entered from the subscriber terminal keypad.

From the network perspective, the service operates as follows. Originating switch 200 sends the calling line identification (CLID) to the terminating switch 100 via signaling network 300. Terminating switch 100 determines that the called party is a CA subscriber and launches a query to listing database 400 (or, alternatively, listing database 500). Terminating switch 100 originates a call to the CA subscriber, synthesizes the CPN and waits for a signal from the subscriber. The CLID may be spoken with the CPN. When switch 100 receives the connect signal from the subscriber, switch 100 connects the calling party and the subscriber.

If the subscriber's line is busy, the calling party receives a busy signal. If the CPN is not available, the CLID is spoken to the called subscriber. If neither the CPN nor the CLID is available, other information (toll call, unlisted number) is spoken to the caller. If the line is privacy protected, a message such as "unlisted name" is spoken to the caller. Distinctive alerting is used to differentiate between CA and conventional calls to a CA station.

Special CA stations, for example, stations 11 and 21, are provided with a speaker attached to the line (or with ISDN, a B-channel). While an incoming call is ringing (or in place of ringing) the name of the caller is spoken over the attached speaker.

As an alternative, the CA feature may require the active participation of the subscriber. When the subscriber goes off-hook, before being connected to the calling party, the subscriber station transmits DTMF or flash signaling and then hears the spoken CPN.

If the subscriber does not answer or denies the CA call, the call is transferred to a message center (or voice storage system) and a text-to-speech header message is provided in conjunction with the caller's message to assure an accurate caller name, caller number and time stamp.

With the improved call waiting (ICW) feature, the conventional call waiting tone is replaced with a text-to-speech announcement of the CPN for the second caller.

FIGS. 2-7 present a flow chart depicting processing of an incoming call by switch 100. Processing begins in decision block 701 (FIG. 2) where it is determined whether the called directory number (DN) belongs to a subscriber of a call announcement (CA) feature or an improved call waiting (ICW) feature. If a negative determination is made in block 701, conventional call processing treatment continues in block 703. If a positive determination is made in block 701, processing continues with decision block 702, where it is determined whether the terminating line is idle. If the terminating line is busy, processing proceeds from block 702 to decision block 705. In block 705, it is determined whether the called DN belongs to an ICW subscriber. If the called DN does not belong to an ICW subscriber, conventional call processing treatment continues in block 703. If the called DN does belong to an ICW subscriber, processing proceeds from block 705 to block 706 wherein the improved call waiting processing is initiated. If the terminating line is determined to be busy in block 702, processing continues with decision block 704 where it is determined whether the called DN belongs to a CA subscriber. If not, conventional call processing treatment continues in block 703. If the called DN belongs to a CA subscriber, processing proceeds from block 704 to decision block 707 where it is determined whether the CA feature is enabled for the called subscriber. If the CA feature is not enabled, conventional call processing treatment continues in block 703. If the CA feature is enabled, processing proceeds from block 707 to decision block 709 where it is determined whether a calling line identification (CLID), typically the caller's DN, is available for the call. If the CLID is not available, conventional call processing treatment continues in block 703. If the CLID is available, processing proceeds from block 709 to decision block 712 where it is determined whether the CLID is privacy protected. If the CLID is privacy protected, conventional call processing treatment continues in block 703. If the CLID is not privacy protected, processing proceeds from block 712 to block 711 where the call announcement processing is initiated.

Call announcement processing begins with decision block 713 (FIG. 3) where it is determined whether the call is a toll call without an available CLID. If a negative determination is made in block 713, execution proceeds to decision block 717 where it is determined whether the CLID is in a personal name list, stored for example in control unit 11 of switch 100 (FIG. 1). If the CLID is in a personal name list, execution proceeds to block 718 (FIG. 3) and the personal name for use from the calling DN is determined (this feature allows the association of personal names with different calling DNs for a given called DN). In block 719, an available text-to-speech unit, e.g., 117 (FIG. 1), is allocated. A variable, ANNOUNCE, is set equal to "PERSONAL NAME" in block 720 (FIG. 3) and ringback is generated to the caller in block 716.

Returning to block 717, if the CLID is not in a personal name list, execution proceeds to block 721 and a calling party name (CPN) query is launched (either via signaling network 300 (FIG. 1) to database 400 or via X.25 link 25 to database 500) to determine a calling party name associated with the calling station. In block 722 (FIG. 3), an available text-to-speech unit is allocated. Execution proceeds to decision block 723 where a determination is made of whether the CPN is private. If the CPN is private, the variable, ANNOUNCE, is set equal to "UNLISTED NAME" in block 724 and ringback is generated to the caller in block 716. If the CPN is not private, execution proceeds to decision block 725 to determine whether text comprising the CPN is now available. If there is no CPN listed in the database or if a timeout occurs, execution proceeds from block 725 to block 727 where the variable, ANNOUNCE, is set equal to ICLID, the calling number. If in block 725 it is determined that the CPN has been obtained, execution proceeds to block 726 and the variable, ANNOUNCE, is set equal to "NAME", the obtained CPN. As an alternative, in block 726', the variable, ANNOUNCE, is set equal to the obtained "NAME" plus ICLID, the calling number. Execution proceeds to block 716 and ringback is generated to the caller.

Figure 3:
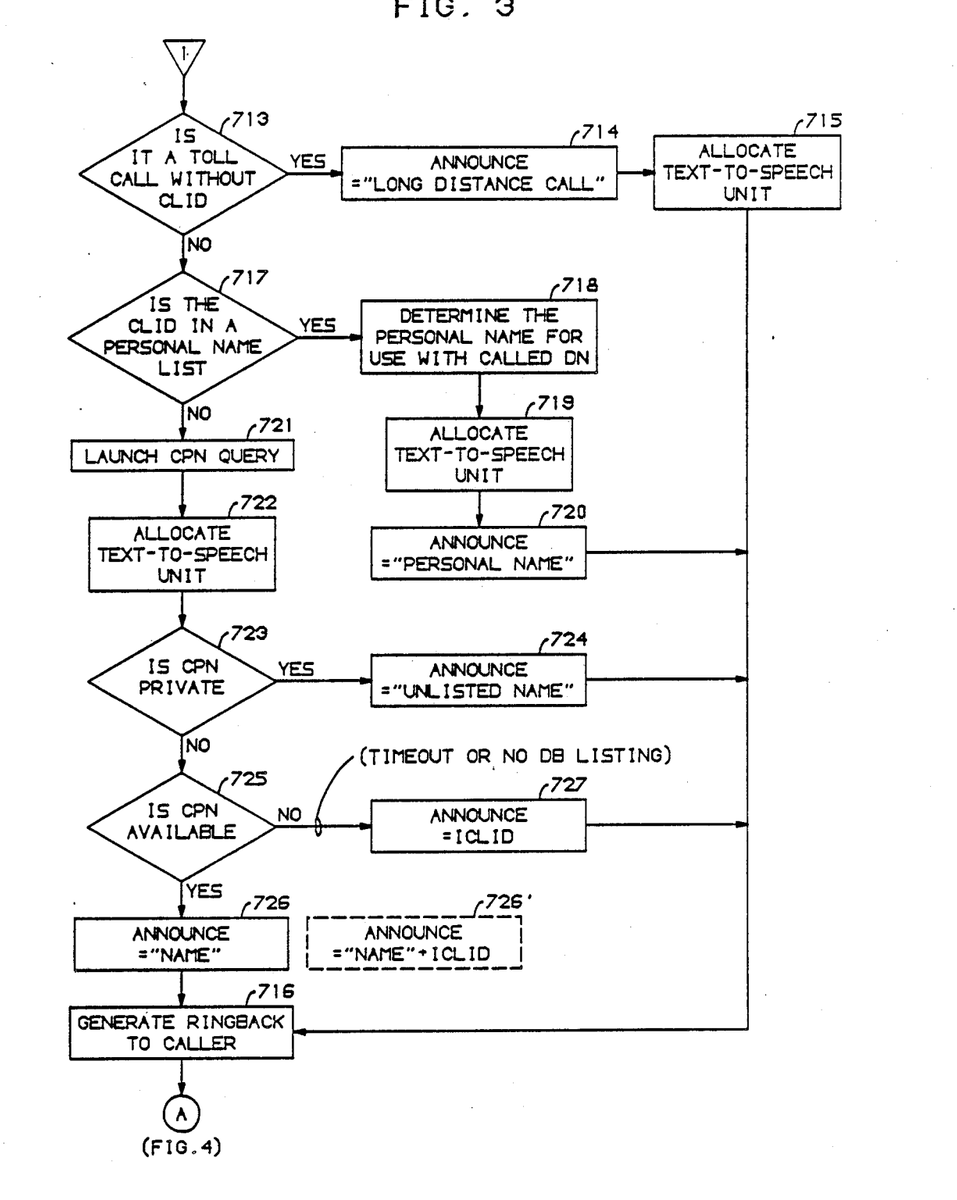
Figure 4:
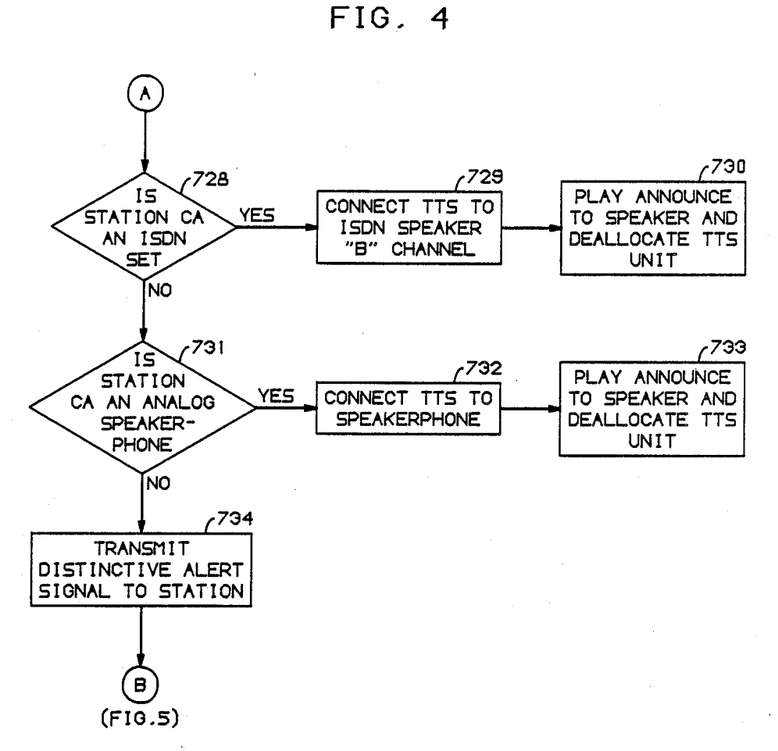

Returning to block 713, if a positive determination is made indicating that the call is a toll call without CLID, execution proceeds to block 714 and the variable, ANNOUNCE, is set equal to "LONG DISTANCE CALL". An available text-to-speech unit is allocated in block 715 and ringback is generated to the caller in block 716.

From block 716, execution proceeds to decision block 728 (FIG. 4) where it is determined whether the called station is a call announcement (CA) ISDN set, for example, station 11 (FIG. 1). If the called station is a CA ISDN set, execution proceeds to block 729 (FIG. 4) and the allocated text-to-speech unit is connected to an ISDN B-channel on digital subscriber line 12 (FIG. 1). In block 730 (FIG. 4), the text comprising the variable, ANNOUNCE, is used to generate speech signals for transmission to station 11 (FIG. 1) and the text-to-speech unit is thereafter deallocated. The remainder of the call is processed as a normal ISDN call.

Returning to block 728 (FIG. 4), if the called station is not a CA ISDN set, execution proceeds to decision block 731 where it is determined whether the called station is a CA analog speakerphone, for example, station 21 (FIG. 1). If the called station is a CA analog speakerphone, execution proceeds to block 732 (FIG. 4) and the allocated text-to-speech unit is connected to analog line 22 (FIG. 1). In block 733 (FIG. 4), the text comprising the variable, ANNOUNCE, is used to generate speech signals for transmission to station 21 (FIG. 1) and the text-to-speech unit is thereafter deallocated. The remainder of the call is processed as a normal analog call.

Returning to block 731 (FIG. 4), if the called station is not a CA analog speakerphone but rather a conventional analog set, for example, station 23 (FIG. 1), execution proceeds to block 734 (FIG. 4) and a distinctive alerting or ringing signal is transmitted on line 24 (FIG. 1) to station 23. In decision block 735 (FIG. 5), a determination is made of whether the subscriber at station 23 (FIG. 1) answers or the caller disconnects. If the caller disconnects, execution proceeds to block 735' (FIG. 5) and alerting stops. If, on the other hand, the subscriber answers, execution proceeds to decision block 736. If the subscriber flashes or transmits a dual tone multi-frequency (DTMF) digit, execution proceeds from block 736 to block 738 and a connection is established between the caller and the called subscriber without call announcement. If no flash or DTMF signaling is detected in block 736, execution proceeds to block 740 and the allocated text-to-speech unit is connected to analog line 24 (FIG. 1). (Alternatively, as shown in block 745 (FIG. 5). block 745 (FIG. 5) active subscriber participation, flash or DTMF signaling, may be required to proceed to block 740.) In block 741, the text comprising the variable, ANNOUNCE, is used to generate speech signals for transmission to station 23 (FIG. 1) and the text-to-speech unit is thereafter deallocated. In decision block 742 (FIG. 5), detection of flash or DTMF signaling during the announcement results in a termination of the announcement and a branch to block 738 where the caller and the called subscriber are connected. Processing waits in block 739 for the caller or the called subscriber to disconnect.

Figure 5:
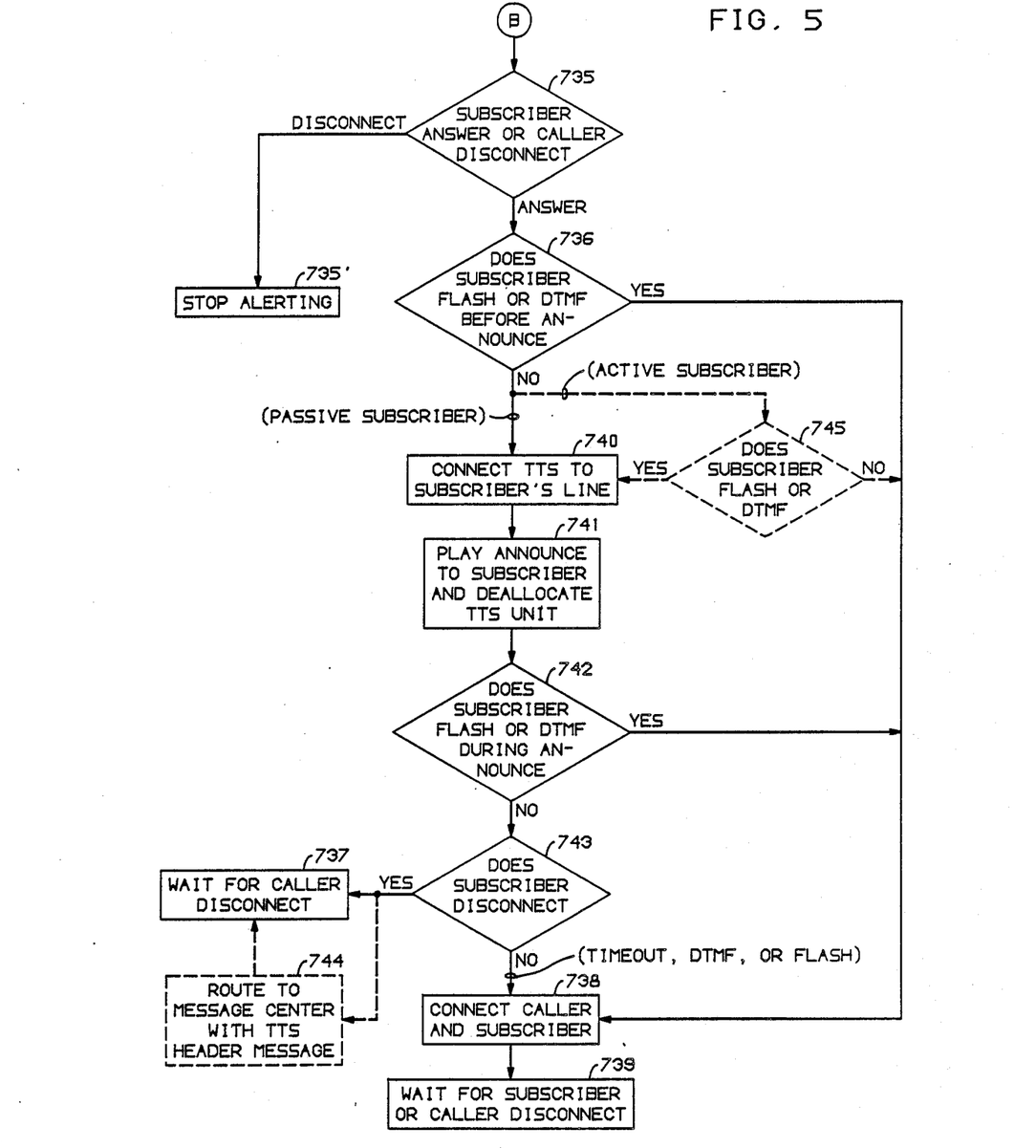
Figure 6:
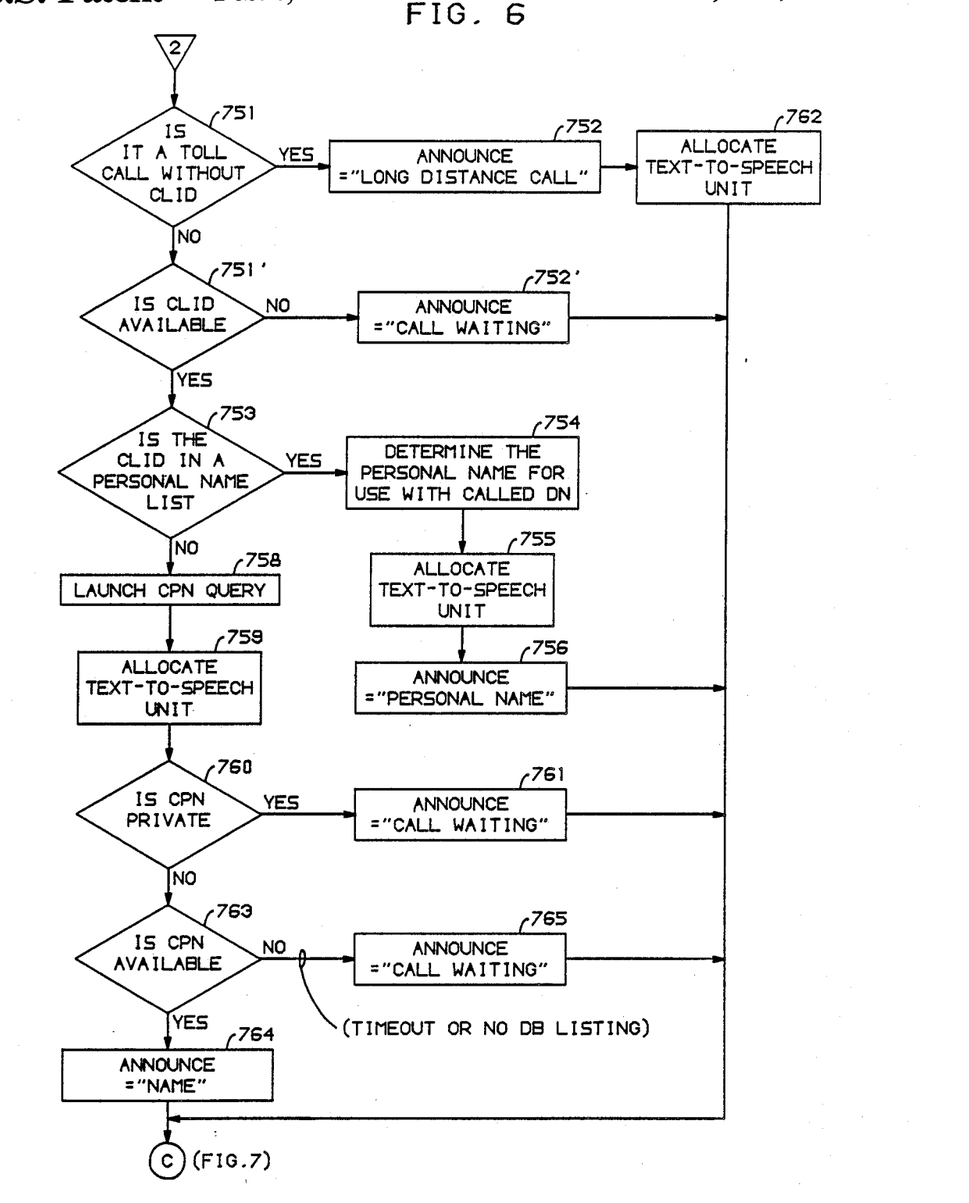

If, in decision block 742, no flash or DTMF signaling is detected during the announcement, execution proceeds to decision block 743. If the called subscriber disconnects, execution proceeds to block 737 and processing waits for the caller to also disconnect. (Alternatively as shown by block 744, after subscriber disconnect is detected in block 743, the call may be routed to a message center. A text-to-speech header message, for example speech signals representing the variable, ANNOUNCE, and a time stamp may be transmitted to the message center to assure accurate caller and time-of-call identification. The caller is then connected to the message center to leave a message.) Returning to block 743, if the subscriber does not disconnect within a defined time period, or if the subscriber flashes or transmits a DTMF digit, execution proceeds from block 743 to block 738 where the caller and the called subscriber are connected. Processing waits in block 739 for the caller or the called subscriber to disconnect.

Figure 7:
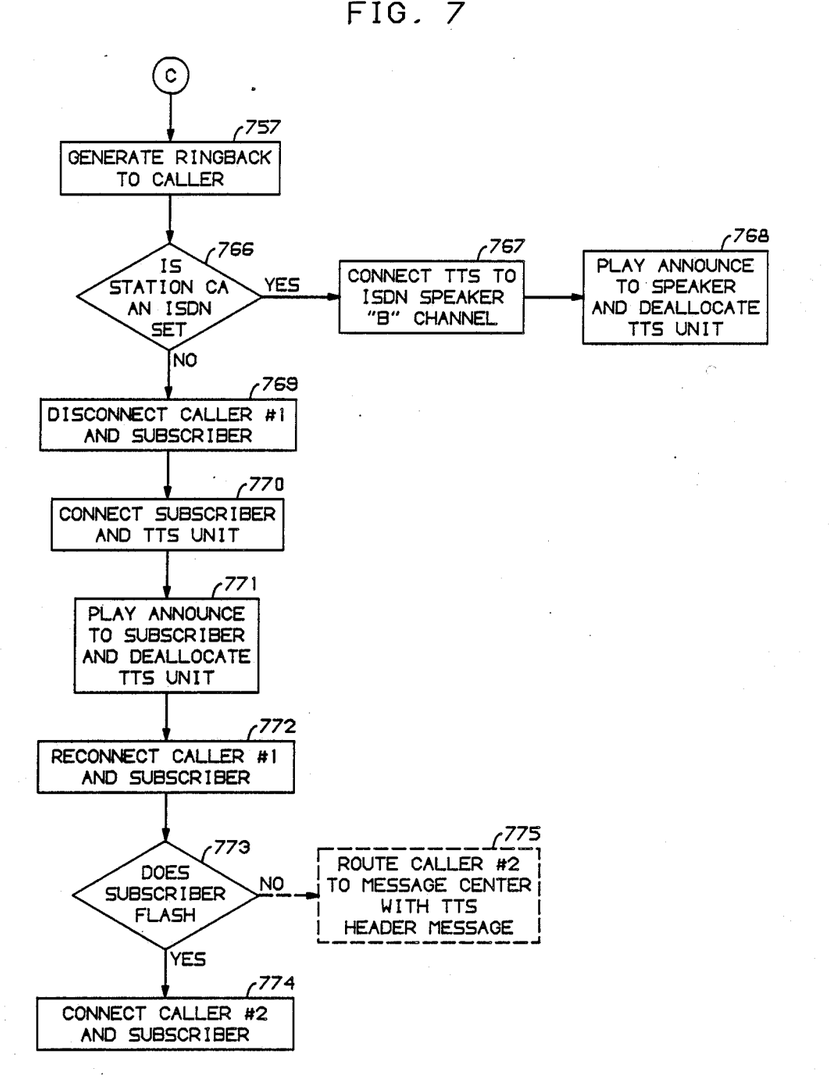

Improved call waiting processing begins with decision block block 751 (FIG. 6) where it is determined whether the call is a toll call without an available CLID. If a negative determination is made in block 751, execution proceeds to decision block 751' where it is determined whether the CLID is available. If the CLID is not available, the variable, ANNOUNCE, is set equal to "CALL WAITING" in block 752'. If the CLID is available, execution proceeds to decision block 753 where it is determined whether the CLID is in a personal name list. If the CLID is in a personal name list, execution proceeds to block 754 and the personal name for use from the calling DN is determined. In block 755, an available text-to-speech unit, e.g., 117 (FIG. 1), is allocated. A variable, ANNOUNCE, is set equal to "PERSONAL NAME" in block 756 (FIG. 6) and ringback is generated to the caller in block 757 (FIG. 7).

Returning to block 753 (FIG. 6), if the CLID is not in a personal name list, execution proceeds to block 758 and a calling party name (CPN) query is launched (either via signaling network 300 (FIG. 1) to database 400 or via X.25 link 25 to database 500) to determine a calling party name associated with the calling station. In block 759 (FIG. 6), an available text-to-speech unit is allocated. Execution proceeds to decision block 760 where a determination is made of whether the CPN is private. If the CPN is private, the variable, ANNOUNCE, is set equal to "CALL WAITING" in block 761 and ringback is generated to the caller in block 757. If the CPN is not private, execution proceeds to decision block 763 to determine whether the text comprising the CPN is now available. If there is no CPN listed in the database or if a timeout occurs, execution proceeds from block 763 to block 765 where the variable, ANNOUNCE, is set equal to "CALL WAITING". If in block 763 it is determined that the CPN has been obtained, execution proceeds to block 764 and the variable, ANNOUNCE, is set equal to "NAME", the obtained CPN. Execution proceeds to block 757 (FIG. 7) and ringback is generated to the caller.

Returning to block 751 (FIG. 6), if a positive determination is made indicating that the call is a toll call without CLID, execution proceeds to block 752 and the variable, ANNOUNCE, is set equal to "LONG DISTANCE CALL". An available text-to-speech unit is allocated in block 762 and ringback is generated to the caller in block 757 (FIG. 7).

From block 757, execution proceeds to decision block 766 where a determination is made of whether the called station is a CA ISDN set. If the station is a CA ISDN set, for example station 11 (FIG. 1), execution proceeds to block 767 (FIG. 7) where the allocated text-to-speech unit is connected to an ISDN B-channel on DSL 12 (FIG. 1). In block 768 (FIG. 7), the text comprising the variable, ANNOUNCE, is used to generate speech signals for transmission to station 11 (FIG. 1) and the text-to-speech unit is thereafter deallocated.

If the determination made in block 766 (FIG. 7) indicates that the called station is not a CA ISDN set, for example conventional analog station 23 (FIG. 1), execution proceeds to block 769 (FIG. 7) where the first caller and the called subscriber are disconnected. In block 770 the allocated text-to-speech unit is connected to the called subscriber. In block 771, the text comprising the variable, ANNOUNCE, is used to generate speech signals for transmission to station 23 and the text-to-speech unit is thereafter deallocated. In block 772, the first caller and the called subscriber are reconnected and execution proceeds to decision block 773 where it is determined whether the called subscriber flashes. If the called subscriber flashes, indicating a desire to interrupt the conversation with the first caller, execution proceeds from block 773 to block 774 and the second caller and the called subscriber are connected. If no flash is detected in block 773, the connection between the first caller and the called subscriber is maintained. (As an alternative, if no flash is detected in block 773 within a defined time, the second caller may be routed to a message center. A text-to-speech header message, for example speech signals representing the variable, ANNOUNCE, and a time stamp may be transmitted to the message center to assure accurate caller and time-of-call identification. The second caller is then connected to the message center to leave a message.)

Figure 8:
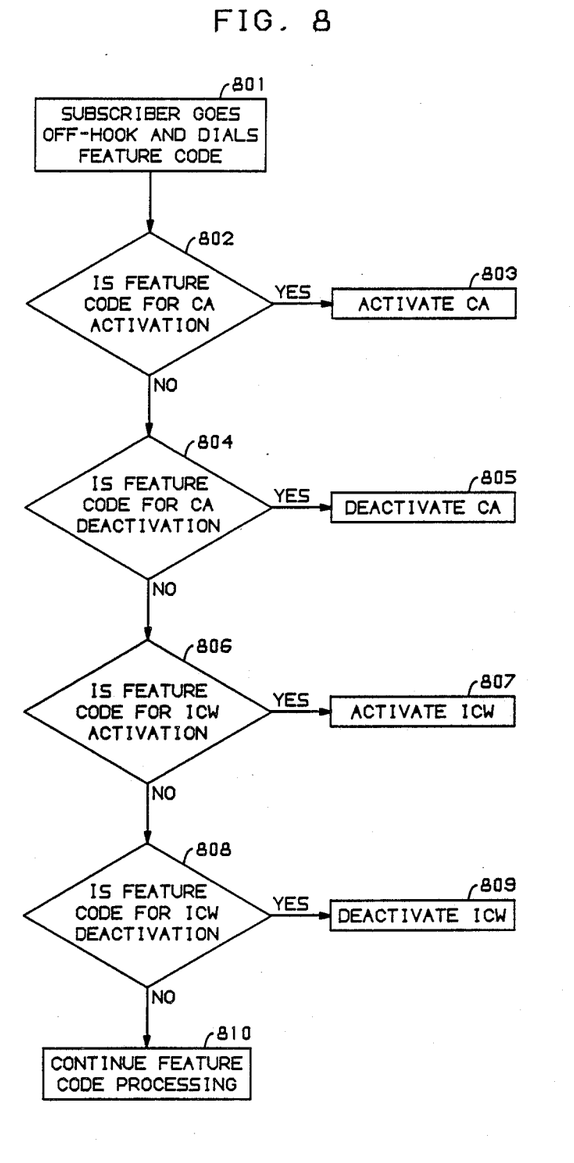
FIG. 8 is a flow chart of the feature activation/deactivation processing for the call announcement and improved call waiting features of FIGS. 2-7.

FIG. 8 is a flow chart of the feature activation and deactivation processing. In block 801, a subscriber goes off-hook and dials a feature code. In decision block 802, it is determined whether the dialed feature code is a (call announcement) CA activation. If it is, the activation is effected in block 803. If the feature code is not a CA activation, execution proceeds to decision block 804, where it is determined whether the dialed feature code is a CA deactivation. If it is, the deactivation is effected in block 805. If the feature code is not a CA deactivation, execution proceeds to decision block 806, where it is determined whether the dialed feature code is an improved call waiting (ICW) activation. If it is, the activation is effected in block 807. If the feature code is not an ICW activation, execution proceeds to decision block 808, where it is determined whether the dialed feature code is an ICW deactivation. If it is, the deactivation is effected in block 809. If the feature code is not an ICW deactivation, execution proceeds to block 810 for continued feature code processing.

Figure 9:
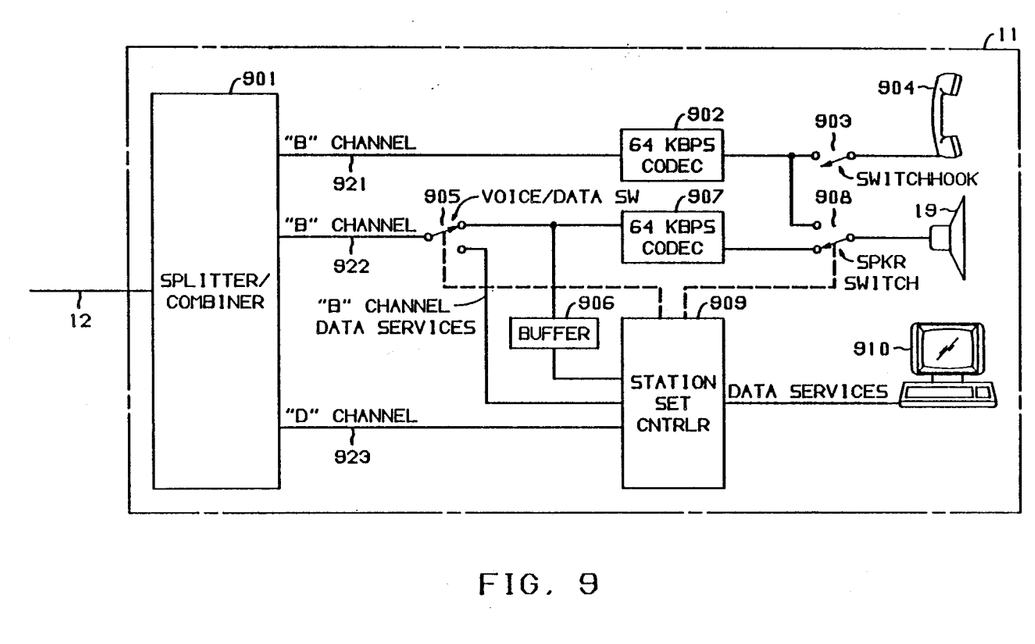
FIG. 9 is a block diagram of one of the communication stations of FIG. 1—an ISDN speakerphone station with call announcement capability.

FIG. 9 is a block diagram of ISDN speakerphone station 11. The two B-channels and the D-channel on digital subscriber line 12 are demultiplexed onto separate paths 921, 922, and 923 by a splitter/combiner 901. In the present illustrative embodiment, the 64 kilobits per second B-channel on path 921 is used exclusively for conveying digitized speech signals. The digital signals are converted to analog speech signals by a 64 kilobits per second coder/decoder (codec) and are transmitted via a switch 903 to the transmitter of handset 904 for audible speech transmission. In the reverse direction, the analog speech signals generated from audible speech by the receiver of handset 904 are transmitted via switch 903 for coding by codec 902 into a 64 kilobits per second digitized speech signal on path 921. The B-channel of path 921 is multiplexed onto DSL 12 by splitter/combiner 901.

In the present embodiment, the 64 kilobits per second B-channel on path 922 is used for either voice or data depending on the position of a voice/data switch 905. The voice signals on path 922 are used for call announcement. When switch 905 is positioned to connect path 922 with a code 907, digitized speech signals on path 922 are converted to analog signals by codec 907. The digitized speech signals on path 922 may also be stored in a buffer 906 under the control of station set controller 909. When a speaker switch 908, operated under the control of a station set controller 909, connects codec 907 to speaker 19, the analog speech signals generated by codec 907 are transmitted to speaker 19 for audible speech transmission. Station set controller 909 operates speaker switch 908 to connect codec 902 to speaker 19 when station 11 is being used in speakerphone mode. When B-channel path 922 is not being used for call announcement voice signals, it may be used to convey digital data to a data terminal 901, via voice/data switch 905 operated under the control of station set controller 909.

The D-channel on path 923 is used for user packet data and for control communication between station set controller 909 and control unit 111 (FIG. 1).

The operation of ISDN station 11 for call announcement is now described. Switch 903 is in the position shown in FIG. 9 since the switch-hook is in the on-hook state (handset 904 is not lifted and the switch on the speakerphone microphone (not shown) is turned OFF).

A call announcement setup message, received on the D-channel of DSL 12, is conveyed via splitter/combiner 901 and path 923 to station set controller 909. In response, controller 909 operates switch 905, to connect path 922 to codec 907, and switch 908, to connect codec 907 to speaker 19. Controller 909 then returns a ready message via path 923 and splitter/combiner 901 to the D-channel of DSL 12. Digitized speech signals representing the calling party name, for example, are then received on a B-channel of DSL 12. The digitized speech signals are conveyed via splitter/combiner 901, path 922, and switch 905 to codec 907. The corresponding analog speech signals are transmitted from codec 907 and switch 908 to speaker 19. The calling party name is announced at station 11. The digitized speech signals on path 922 are also stored by buffer 906. The stored signals are repetitively retransmitted to codec 907 such that the calling party name announcement is repeated until the call is answered. The calling party name announcement is used in place of, or in addition to, normal ringing at station 11. Once the called party answers—i.e., goes off-hook by lifting handset 904 or turning the switch on the speakerphone microphone (not shown) ON, switch 903 is closed, answer signaling, for example a CONNECT message, is transmitted on the D-channel of DSL 12, and the call announcement is discontinued. Switch 905 may be repositioned to allow the B-channel on path 922 to be used for digital data. Switch 908 may be repositioned to allow the speech signals for the voice conversation to be transmitted to speaker 19. (Alternatively, the call announcement speech signals may be transmitted over the same B-channel as the speech signals for the subsequent voice conversation.)

Station 11 may also be used for call announcement during an existing call in accordance with the improved call waiting feature described herein. The operation is similar to that described except that switch 903 is closed to convey the voice conversation of the existing call at the time the call announcement setup message is received on the D-channel of DSL 12.

Figure 10:
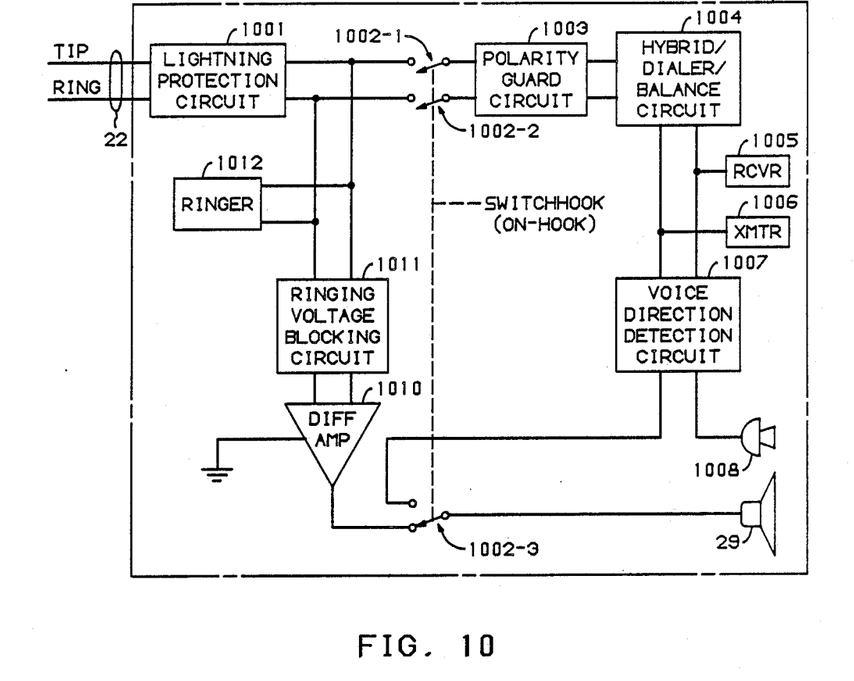
FIG. 10 is a block diagram of a second communication station of FIG. 1—an analog speakerphone station specially adapted to have call announcement capability.

FIG. 10 is a block diagram of analog speakerphone station 21, which is specially adapted for call announcement. Station 21 is a standard speakerphone (having a handset receiver 1005 and transmitter 1006 and a speakerphone microphone 1008 and speaker 29) with the following additions. Preceding switch-hook contacts 1002-1 and 1002-2 and in parallel with ringer 1012, is a ringing voltage blocking circuit 1011 which blocks ringing voltage by either completely eliminating it or by attenuating or clipping to a low level signal. Circuit 1011 passes unaffected low-level, voice frequency signals on the tip and ring conductors of analog line 22. Circuit 1011 has a high input impedance to assure that switch 100 (FIG. 1) does not falsely detect off-hook from station 21. A differential amplifier 1010 provides isolation, amplifies the voice-frequency signal, and references it to ground. Additional switch-hook contacts 1002-3 connect the speakerphone speaker 29 to the output of voice direction detection circuit 1007 when the line is on-hook and connects speaker 29 to the output of differential amplifier 1010 when the line if off-hook. (Note that for an analog station that is not a speakerphone, switch-hook contacts 1002-3 need only disconnect differential amplifier 1010 from a special speaker used for call announcement so that normal conversational voice signals are not output thereto.)

Lightning protection circuit 1001, polarity guard circuit 1003, hybrid/dialer/balance circuit 1004, ringer 1012, and voice direction detection circuit 1007 are part of the standard speakerphone station set.

Figure 11:
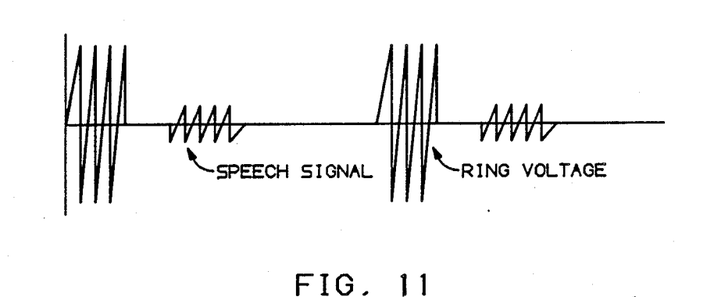
FIG. 11 is a waveform diagram for combined ringing and speech signals usable by the communication station of FIG. 10.

Switch 100 (FIG. 1) generates the call announcement speech signals by connecting a text-to-speech unit in parallel with the switch 100 ringing voltage generator (not shown). During the silent interval of the ring cycle (FIG. 11), the text-to-speech unit generates an audio signal which is sent over tip and ring of analog line 22 to station 21.

It is to be understood that the above-described arrangements are merely illustrative of the principles of the invention and that many variations may be devised by those skilled in the art without departing from the spirit and scope of the invention. For example, an announcement unit using voice recordings of calling party names may be used rather than a text-to-speech unit in some applications. It is therefore intended that such variations be included within the scope of the claims.

I claim:

1. A method of processing a call from a calling communication station to a called communication station comprising
   in response to said call, effecting a search for information associated with said calling station,
   transmitting speech signals, generated from information obtained during said search, to said called station, and
   in response to disconnect signaling from said called station, transmitting speech signals representing call information, including said obtained information, to a message center.

2. A method in accordance with claim 1 further comprising
   after transmitting said speech signals representing call information, completing a communication path between said calling station and said message center.

3. A method in accordance with claim 1 wherein said call information further includes a timestamp.

4. A method in accordance with claim 1 wherein said obtained information comprises text.

5. A method in accordance with claim 1 wherein said obtained information comprises recorded speech.

6. A method in accordance with claim 1 wherein said obtained information comprises a name associated with said calling station, and wherein said speech signals transmitted to said called station represent said name.

7. A method in accordance with claim 1 wherein said obtained information comprises a directory number associated with said calling station, and wherein said speech signals transmitted to said called station represent said directory number.

8. A method in accordance with claim 1 wherein said obtained information comprises a name and a directory number associated with said calling station, and wherein said speech signals transmitted to said called station represent said name and said directory number.

9. A method of processing a call from a calling communication station to a called communication station comprising
   in response to said call, effecting a search for information associated with said calling station,
   determining whether said called station is busy on another call,
   upon determining that said called station is busy on another call, disconnecting a communication path between a calling communication station for said another call and said called station, after disconnecting said communication path, transmitting speech signals, generated from information obtained during said search, to said called station, after transmitting said speech signals to said called station, completing a communication path between said last-mentioned calling station and said called station, and after said completing and in response to receipt of signaling from said called station, completing a communication path between said first-mentioned calling station and said called station.

10. A method in accordance with claim 9 wherein said signaling comprises flash signaling.

11. A method in accordance with claim 9 wherein said obtained information comprises text.

12. A method in accordance with claim 9 wherein said obtained information comprises recorded speech.

13. A method in accordance with claim 9 wherein said obtained information comprises a name associated with said calling station, and wherein said speech signals transmitted to said called station represent said name.

14. A method in accordance with claim 9 wherein said obtained information comprises a directory number associated with said calling station, and wherein said speech signals transmitted to said called station represent said directory number.

15. A method in accordance with claim 9 wherein said obtained information comprises a name and a directory number associated with said calling station, and wherein said speech signals transmitted to said called station represent said name and said directory number.

16. A method in accordance with claim 9 wherein said obtained information comprises a privacy indicator, and wherein said speech signals transmitted to said called station represent a definition of unavailability of a calling party name for said call.

17. A method in accordance with claim 9 wherein said obtained information defines said call from said calling station as a toll call, and wherein said speech signals transmitted to said called station represent a definition of said call as a toll call.

18. A method of processing a call from a calling communication station to a called communication station comprising in response to said call, effecting a search for information associated with said calling station, determining whether said called station is busy on another call, upon determining that said called station is busy on another call, disconnecting a communication path between a calling communication station for said another call and said called station, after disconnecting said communication path, transmitting speech signals, generated from information obtained during said search, to said called station, after transmitting said speech signals to said called station, completing a communication path between said last-mentioned calling station and said called station, and after said completing and in response to receipt of signaling from said called station, disconnecting said completed communication path and completing a communication path between said first-mentioned calling station and said called station.

19. A method of processing a call from a calling communication station to a called communication station comprising in response to said call, effecting a search for information associated with said calling station, determining whether said called station is busy on another call, upon determining that said called station is busy on another call, disconnecting a communication path between a calling communication station for said another call and said called station, after disconnecting said communication path, transmitting speech signals, generated from information obtained during said search, to said called station, after transmitting said speech signals to said called station, completing a communication path between said last-mentioned calling station and said called station, and after said completing and in response to expiration of a predefined time period without receiving signaling from said called station, transmitting speech signals representing call information, including said obtained information, to a message center.

20. A method in accordance with claim 19 further comprising after transmitting said speech signals representing call information, completing a communication path between said first-mentioned calling station and said message center.

21. A method of processing a call from a calling communication station to a called communication station comprising in response to said call, effecting a search for information associated with said calling station, transmitting speech signals, generated from information obtained during said search, to said called station, and in response to disconnect signaling from said called station, transmitting call information, including said obtained information, to a message center.

22. A method of processing a call from a calling communication station to a called communication station comprising in response to said call, effecting a search for information associated with said calling station, transmitting information obtained during said search to said called station, and in response to disconnect signaling from said called station, transmitting call information, including said obtained information, to a message center.

23. A method of processing a call from a calling communication station to a called communication station comprising in response to said call, effecting a search for information associated with said calling station, determining whether said called station is busy on another call, upon determining that said called station is busy on another call, disconnecting a communication path between a calling communication station for said another call and said called station, after disconnecting said communication path, transmitting speech signals, generated from information obtained during said search, to said called station, after transmitting said speech signals to said called station, completing a communication path between said last-mentioned calling station and said called station, and after said completing and in response to expiration of a predefined time period without receiving signaling from said called station, transmitting call information, including said obtained information, to a message center.

24. Apparatus for processing a call from a calling communication station to a called communication station comprising switching means connectable to said calling and called stations, and control means for controlling said switching system and operable under control of a program for controlling the following operations:

in response to said call, effecting a search for information associated with said calling station, determining whether said called station is busy on another call, upon determining that said called station is busy on another call, disconnecting a communication path of said switching means between a calling communication station for said another call and said called station, after disconnecting said communication path, transmitting speech signals, generated from information obtained during said search, to said called station, after transmitting said speech signals to said called station, completing a communication path of said switching means between said last-mentioned calling station and said called station, and after said completing and in response to receipt of signaling from said called station, completing a communication path of said switching means between said first-mentioned calling station and said called station.

25. Apparatus for processing a call from a calling communication station to a called communication station comprising switching means connectable to said calling and called stations, and control means for controlling said switching system and operable under control of a program for controlling the following operations:

in response to said call, effecting a search for information associated with said calling station, transmitting speech signals, generated from information obtained during said search, to said called station, and in response to disconnect signaling from said called station, transmitting call information, including said obtained information, to a message center.

26. Apparatus for processing a call from a calling communication station to a called communication station comprising switching means connectable to said calling and called stations, and control means for controlling said switching system and operable under control of a program for controlling the following operations:

in response to said call, effecting a search for information associated with said calling station, transmitting information obtained during said search to said called station, and in response to disconnect signaling from said called station, transmitting call information, including said obtained information, to a message center.

* * * * *